(12) United States Patent
Pavlyuchenko et al.

(10) Patent No.: US 6,235,810 B1
(45) Date of Patent: May 22, 2001

(54) METHOD FOR THE PREPARATION OF HOLLOW POLYMER PARTICLE LATEX

(75) Inventors: Valery Pavlyuchenko; Nina Byrdina; Sergey Ivanchev, all of St. Petersburg (RU); Mikael Skrifvars; Erkki Halme, both of Helsinki (FI); Hanna Laamanen; Jukka Koskinen, both of Espoo (FI)

(73) Assignee: Neste Chemicals OY, Porvoo (FI)

( * ) Notice: Subject to any disclaimer, the term of this patent is extended or adjusted under 35 U.S.C. 154(b) by 0 days.

(21) Appl. No.: 09/380,543

(22) PCT Filed: Mar. 4, 1998

(86) PCT No.: PCT/FI98/00194
§ 371 Date: Nov. 22, 1999
§ 102(e) Date: Nov. 22, 1999

(87) PCT Pub. No.: WO98/39372
PCT Pub. Date: Sep. 11, 1998

(30) Foreign Application Priority Data

Mar. 5, 1997 (FI) .......................................... 970936

(51) Int. Cl.$^7$ .............................. C08F 2/26; C08F 265/02; C08F 265/04; C08F 265/06; C08F 285/00
(52) U.S. Cl. ........................ 523/201; 524/460; 525/244; 525/267; 525/902; 526/75; 526/203
(58) Field of Search ........................... 523/201; 524/460; 525/244, 267, 902; 526/75, 203

(56) References Cited

U.S. PATENT DOCUMENTS

| | | |
|---|---|---|
| 4,427,836 | 1/1984 | Kowalski et al. . |
| 4,880,842 | 11/1989 | Kowalski et al. . |
| 4,910,229 | 3/1990 | Okubo . |
| 5,157,084 | 10/1992 | Lee et al. . |
| 5,360,827 | 11/1994 | Toda et al. . |
| 5,447,560 | 9/1995 | Vogel . |
| 5,521,253 | 5/1996 | Lee et al. . |

FOREIGN PATENT DOCUMENTS

| | | |
|---|---|---|
| 0022633B1 | 1/1981 | (EP) . |
| 0321096A3 | 6/1989 | (EP) . |
| 0478829B1 | 4/1992 | (EP) . |

OTHER PUBLICATIONS

Polym. Mater, Sci–Eng., vol. 64, 1991, J. W. Vanderhoff et al, pp. 345–346.
Abstract of CA 115:159942, Preparation of soft hydrophilic polymer core/hard hydroprobit polymer shell particles ƒ microvoid coatings by seeded emulsion polymerization (1991).
Vanderhoff et al. "Preparation of soft hydrophilic polyner core/hard hydrophobic polymer shell particles for microvoid coatings by seeded emulsion polymerization", Polym. Mater. Sci. Eng., vol. 64, pp. 345–346, 1991.*

\* cited by examiner

Primary Examiner—David W. Wu
Assistant Examiner—K. C. Egwim
(74) Attorney, Agent, or Firm—Birch, Stewart, Kolasch & Birch, LLP

(57) ABSTRACT

A method for the preparation of latexes with hollow polymer particles useful as opacifying agents. The process comprises the preparation of hollow polymer particle latex by emulsion copolymerization with water soluble initiator and anionic surfactant as follows: a) preparation of seed latex of copolymer containing methyl methacrylate and methacrylic acid; b) preparation of latex of highly carboxylated copolymer containing methyl methacrylate and a cross-linking agent and optionally a vinyl aromatic compound; c) using highly carboxylated latex synthesized at stage b) in the preparation of the intermediate shell comprising a copolymer of methyl methacrylate, acrylic acid ester, a cross-linking agent and optionally vinyl aromatic compound, said intermediate shell copolymer having a glass transition temperature below 80° C.; d) swelling the particles prepared at stage c) by addition of volatile basic compound; e) preparation of a hard shell on the swollen expanded particles comprising a copolymer of vinyl aromatic compound, acrylonitrile and/or methyl methacrylate, and cross-linking agent, said hard shell having a glass transition temperature above 80° C.; and f) optional preparation of an external shell.

14 Claims, No Drawings

METHOD FOR THE PREPARATION OF HOLLOW POLYMER PARTICLE LATEX

This application is the national phase under 35 U.S.C. §371 of PCT International Application No. PCT/FI98/00194 which has an International filing date of Mar. 4, 1998, which designated the united states of America.

The present invention relates to a method for the preparation of latexes with hollow polymer particles. Hollow polymer particles are useful as opacifying agents in coating applications, such as in paint or paper coating, especially for high quality paper products where colour pictures are presented, such as art books, brochures, annual reports, magazines etc. The use of hollow particle latex in such coatings reduces or removes the need for pigments, such as titanium dioxide, or extenders, without adding excessive and undesirable weight to the coating. The hollow polymer particle latex provides opacity because the hollow structure in a latex particle scatters light more efficiently than a corresponding particle of uniform density. The light scattering properties are related to a difference in the refractive index between the shell and the internal void. The particles can also be used as control release devices for target compounds. Hollow polymer particles have found extensive applications as white pigments, ie. hollow sphere pigments have excellent optical properties such as hiding power, opacity, gloss, brightness and whiteness as well as thermal resistance providing benefits in printing performance and production efficiency, for example faster calendering. Further, they have started to replace the earlier used polymers filled uniformly in particles.

In the prior art, some methods have been known for the production of microvoid containing polymer particles. All these methods lead to a core and shell particles with different microvoids in the center. The hollow polymer latex particles having a centered void have a greater utility in coatings than those structures having microvoid or hemispherical particles with voided centers.

Some methods have also been proposed for the preparation of hollow polymer particles. EP patent number 22633 discloses a process which comprises copolymerizing an ethylenically unsaturated monomer with a carboxyl group containing ethylenically unsaturated monomer by emulsion polymerization to prepare seed particles of the core part, carrying out cover polymerization using an ethylenically unsaturated monomer for the formation of the particle surface layer eg. shell part, neutralizing after completion of polymerization the resulting particles with a volatile base such as ammonia, and swelling the particles into hollow particles. In this process, four-stage polymerization is carried out so as to make a polymer composition of the core part and the shell part different. The process is complicated and it is difficult to control the reaction temperature, the quantity of the polymerization initiator, the quantity of the surfactant etc. Thus, it is difficult to form hollow particles stably, resulting in high levels of copolymerized acid remaining in the core polymer. There also appears to be no intermediary layer between the core and the shell, which may be the reason for the weak opacity.

U.S. Pat. No. 4,427,836 discloses the production of sequential heteropolymer dispersion and a particulate material obtainable therefrom, comprising an ionic, swellable, hard core polymer and a sheath polymer on the core. In this method, the preparation of the core/sheath polymer particles is realized using sequential emulsion polymerization to yield the core, then polymerizing the sheath on the core particles, neutralizing the resultant core/sheath particles to swell the core and to form particles with a single void when dried. The product contains only two layers, the core and the sheath. This may be the reason why the opacifying compositions are only whitish, but not white.

U.S. Pat. No. 4,880,842 discloses a process for making hollow latexes by introducing a non-polymeric acid to an early stage of the multi-stage polymer particles instead of copolymerizing acid to make swellable cores. This method for preparing hollow latexes requires cores containing acid or acidic monomers to enable swelling to occur at room temperature. The existence of acid in a polymer disadvantageously increases the polymers' affinity to water. The sensitivity to the effects of water undesirably renders the coating into which the latex is formulated, sensitive to moisture as well, which is an undesirable property in coating applications. An acidic core is also thought to impart polarity to the polymer and because of such polarity the polymer is thought not to absorb surfactants well, rendering the polymer unstable or prone to coagulation or aggregation in larger particles. The water sensitivity of the core or high affinity for water by the core is thought to make it difficult to encapsulate the core with the shell polymer because the core tends to remain at the polymer-water interface on the surface of the particle rather than to be encapsulated by the shell. This process for preparing hollow polymer particles also requires a post-encapsulating step with cross-linked polymers, that is the acid containing cores are encapsulated with an uncrosslinked shell, the core is swelled, and then the shell can be encapsulated with cross-linked polymers. Additionally, substantive amounts of the chain-transfer agent n-dodecyl mercaptan are needed to accomplish this process.

U.S. Pat. No. 4,910,229 discloses a process which comprises adding a base to a carboxyl group containing copolymer latex to neutralize at least part of the carboxyl groups in the copolymer, eg. base treatment and then lower the pH of the latex with an acid, eg. acid treatment to produce hollow particles. In this process it is necessary to neutralize the carboxyl groups in the polymer particles, and in order to make the base necessary for neutralization permeate sufficiently into the polymer particles, there is a necessity to raise treatment temperature from a temperature somewhat lower than the glass transition temperature ($T_g$) of the polymer to a temperature equal to or more than $T_g$ and raise the diffusion rate of the base. Usually this kind of process results in multihollow morphology of the particles.

U.S. Pat. No. 5,360,827 discloses a process for the preparation of latex of a hollow polymer which comprises adding a base in the presence of a monomer to latex containing carboxylic modified copolymer particles to make the pH of the latex 8 or more, and adding a carboxyl group containing a monomer to make pH of the latex 7 or less and then polymerizing these monomers. This process leaves high amounts of residual monomers in the product and thus, an additional steam distillation operation is required.

U.S. Pat. No. 5,157,084 discloses a process of making hollow polymer latex particles without the use of acid in the swellable polymer core. The swelling step is performed at elevated temperatures, usually above 100° C. and thus, it must be performed under pressure.

The European patent application, publication No. 478 829 discloses a process for the preparation of hollow latex polymers characterized by emulsion polymerization of monomers in the presence of organic hydrocarbons, which tend to leave solvent residues in the product and are costly to use. An additional operation is needed for the removal of residual solvents from the product.

In general, all methods in the state of the art are multistage processes requiring the isolation of the intermediate latexes, several reactors and time consuming expensive cleaning operations between the stages.

An object of the present invention lies in providing a new, efficient, economic and environmentally advantageous process for the preparation of stable hollow polymer latex particles, based on the development of a hard, cross-linked shell on highly carboxylated seed particles pre-swelled in aqueous volatile base solution. Surprisingly the present inventors found that the above-identified objects can be attained by realizing the following process, which requires no chain transfer agents, no additional steam distillation steps, no pressurizing, no organic solvents, no elevated temperatures above 100° C., and which yields a white and opaque product with an additional intermediary layer. The process can be performed batchwise in one reactor without any isolation of intermediate latexes and without additional cleaning etc. operations.

Accordingly, the present invention provides for an efficient and economic process for the preparation of hollow latex polymer particles with a high glass transition temperature $T_g$, with particle size between 0.3–0.6 $\mu$m and with suitable rheology.

The process comprises preparing hollow polymer particle latex by emulsion copolymerization with water soluble initiator and anionic surfactant, using batch, semi-continuous batch or continuous batch methods as follows:

a) preparation of seed latex of copolymer containing methyl methacrylate and methacrylic acid;

b) preparation of latex of highly carboxylated copolymer containing methyl methacrylate and a cross-linking agent and optionally a vinyl aromatic compound;

c) using highly carboxylated latex synthesized at stage (b) in the preparation of the intermediate shell comprising a copolymer of methyl methacrylate, acrylic acid ester, a cross-linking agent and optionally a vinyl aromatic compound, said intermediate shell copolymer having a glass transition temperature below 80° C.;

d) swelling the particles prepared at stage (c) by the addition of a volatile basic compound;

e) preparation of a hard shell on the swollen expanded particles comprising a copolymer of vinyl aromatic compound, acrylonitrile and/or methyl methacrylate, and cross-linking agent, said hard shell having a glass transition temperature above 80° C.; and f) optional preparation of an external shell consisting of a copolymer of a vinyl aromatic compound, an acrylic acid ester, a methacrylic acid and a cross-linking agent with glass transition temperature below 15° C.

Stage (a) preferably comprises the preparation of a seed latex copolymer containing methyl methacrylate and methacrylic acid and the optional preparation of the seed latex when weight ratio of monomer/initiator/water is equal to 1/(0.1–0.3)/(50–150).

The ratios of the weight concentrations of the copolymers prepared during different stages are important parameters of the process.

Preferred ratios of the polymers obtained in different stages are presented below.

| Stage No | a | b | c | e | f |
|---|---|---|---|---|---|
| Preferred ratio | 1 | 5–20 | 25–60 | 20–60 | 2–60 |

The overall process is preferably performed in a single reactor as a one-pot process but it also may be performed as a conventional stepwise process with the isolation of intermediate latexes using several reactors.

At stage (a) seed latex is prepared by emulsion copolymerization of 98.8–99.5 weight parts, preferably 97.0–98.5 weight parts of methyl methacrylate with 0.5–4.0 weight parts, preferably 1.5–3.0 weight parts of methacrylic acid.

When preparing the hollow latex polymer particle via a seeded process, a seed latex prepared at stage (a) having a particle size from 70 to 180 nm is required, and the particle size range of 80–130 nm is preferred.

At stage (b), latex of highly carboxylated copolymer containing methyl methylacrylate, cross-linking agent and acid monomer is prepared by using the seed latex prepared at stage (a) for obtaining copolymer latex.

The preferred acid monomers that may be used for the alkali-swellable core are monoethylenically unsaturated carboxylic acid monomers, such as, acrylic acid, methacrylic acid and ithaconic acid. As the principal role of the acid monomers at stages (a), (b), and (c), the acid monomers provide the preparation of the carboxylated core, which is able to swell when the carboxylic groups are neutralized with a volatile base, at stage (f) the acid monomers primarily provide the stability of the latex.

The cross-linking agent is meant to include monomers conventionally known in the art as useful for cross-linking polymerizable monomers. Examples of such monomers typically include di- or trifunctional monomer such as divinyl benzene, ethylene glycol methacrylate, ethylene glycol acrylate and allyl methacrylate.

In the copolymerization of core polymer latex 60–80 parts, preferably 65–75 parts of methyl methylacrylate and 20–40 parts, preferably 25–35 parts of acid monomer, and 0.3–0.8 parts, preferably 0.4–0.6 parts of cross-linking agentare used.

The acid monomers provide the preparation of carboxylated core which is able to swell when the carboxylic groups are neutralized at later stage (d) with volatile base. In addition, the acid monomers improve the colloidal stability of the latexes, especially at stage (f).

At stage (c) the highly carboxylated latex prepared at stage (b) is used for the preparation of an intermediate shell on latex particles. The intermediate shell comprises a copolymer of methyl methylacrylate, acrylic acid ester and cross-linking agent and said intermediate shell has a glass transition temperature below 80° C. The acrylic acid ester may be, for example, n-butylacrylate, isobutyl acrylate or 2-ethyl hexylacrylate.

The amount of monomers used at stage (c) are as follows: 60–85 weight parts, preferably 70–80 weight parts of methyl methacrylate, 15–25 weight parts, preferably 16–19 weight parts of acrylic acid esters and 2–8 weight parts, preferably 4–5 weight parts of acid monomers. Optionally, the monomer mixture contains also 0–0.6, preferably 0.1–0.3 weight parts of cross-linking agents mentioned above.

At stage (d) the particles prepared at stage (c) are swelled by adding a volatile basic compound.

Volatile bases, such as ammonia, or volatile organic bases, such as triethylamine, trimethylamine or diethyl ethanol amine are used as suitable swelling agents.

The concentration of volatile basic compound at stage (d) is preferably calculated in accordance with the following equation:

$$[B]=a/D-b$$

where [B] is the volatile base concentration calculated as milliequivalents per 1 g of methacrylic acid charged at stages (a), (b) and (c), D is number average diameter of the seed particles (in nanometers) prepared at stage (a) and a and b are constants, ie. a=1670 and b=4.1.

The volatile base concentration at stage (d) is preferably 2–10% by weight and more preferably 3.5–6% by weight.

The swelling time can be 30–120 min, preferably 40–80 min.

At stage (e), a hard shell having a glass transition temperature above 80° C. is prepared on the swollen expanded particles from stage (c). This shell comprises a copolymer of vinyl aromatic compound, such like styrene, acrylonitrile and/or methyl methacrylate and a cross-linking agent. The monomers used at this stage are as follows: 0–35 weight parts, preferably 15–30 weight parts of methyl methacrylate, 60–99 weight parts, preferably 70–80 weight parts of styrene, 0–35 weight parts, preferably 15–30 weight parts of acrylonitrile and 1–10 weight parts, preferably 2–5 weight parts of cross-linking agent mentioned above.

An optional stage (f) comprises preparation of an extended shell consisting of a copolymer of vinyl aromatic compound, an acrylic acid ester, methacrylic acid and a cross-linking agent and having a glass transition temperature below 15° C. This can be obtained by copolymerizing 3–10 weight parts, preferably 4–7 weight parts of methacrylic acid, 55–75 weight parts, preferably 60–75 weight parts of acrylic acid ester, 20–40 weight parts, preferably 30–35 weight parts of styrene and 0.2–3.5 weight parts, preferably 0.4–1.0 weight parts of cross-linking agent.

Vinyl aromatic compounds, such as styrene, p-methylstyrene and mixtures of isomers of methylstyrene can optionally be used at stages (b) and (c). The amount of vinyl aromatic compound is 0–20 weight parts, preferably 0–10 weight parts. Further, the ratio of weight concentrations of the sum of methyl methylacrylate and vinyl aromatic compound to acrylic acid ester at stage (c) is preferably within the range of 3.3–4.3 and the ratio of weight concentration of the copolymer prepared at stage (f) to the copolymer prepared at stage (e) is preferably 0.1–1.0.

The overall reaction temperature at all stages except stage (d) is 60–95° C., preferably 80–90° C. The reaction temperature of stage (d) is 80–95° C.

The water soluble free radical initiators suitably employable in the aqueous phase are those typically known in the art, for example sodium persulphate, potassium persulphate and ammonium persulphate. The effective amount of the initiator can be from 0.25 to about 3.00%, preferably 0.6–1.45% by weight of the monomer charged at all stages. The initiator is added at stage (b) advantageously as two equal portions in the beginning of the reaction and in the middle of the reaction.

In all steps, surface active agents typically known in the art for polymerization processes can be used. Typical surfactants include anionic emulsifiers, such as, sodium dodecyl benzene sulphonates, sodium alkyl sulphonates ($C_{12}$–$C_{18}$) in effective amounts to assist in stabilizing the particle as a colloid minimizing contact between the particles and preventing coagulation, when used before the swelling step.

A higher polymer solid level will increase the need for surfactant. An effective amount of the surfactant can be 0.1–3% by weight of the monomer charged, in some cases no surfactant is needed. Advantageously, the anionic surfactant is charged in equal portions in equal periods of time.

The obtained final product contains very low concentrations of residual monomers, which is due to the reaction conditions of this process.

The hiding power of hollow particle polymer latexes is determined by the following method. The hiding power can be expressed by the amount of grams of the pigment for a surface of 1 $m^2$ using a photometric method. 4 to 5 glass plates are coated with a latex composition (hollow particles+ film forming latex). The reflection coefficient of the coated glass plate at λ=582 nm is determined using a photometer. The glass plate is placed on a white surface with a reflection coefficient of 86% and then a black surface with a reflection coefficient of less than 1%. Then, the contrast coefficient R is calculated as the ratio of reflection coefficients. The hiding power is calculated from the relationship of R to the weight content of the pigment for a surface of 1 $m^2$. The weight content of the pigment (PWC) value relevant to R=0.98 is taken for hiding power.

The diameter of the hollow particle is determined experimentally as well as the wall thickness.

The hollow polymer particle latexes of the present invention may be used in coating formulations or coating systems to replace all or part of the opacifying pigments.

The hollow polymer particle latex may be formulated to a composition for the preparation of white and opaque coatings, for example, in the following manner:

| | |
|---|---|
| Hollow particle latex with solids 28–32% | 4.5–5.0 g |
| Film forming latex (latex of copolymer of styrene-acrylic acid ester-acrylic acid) with minimum film formation temperature from 10–15° C., with particle size 200–300 μm | 7.5 g |
| Water | 2.0 to 4 g |
| Ammonia solution (7.2%) | 0.2–0.3 g |

The following examples are illustrative embodiments of the present invention and are not meant to narrow the scope of the process of the invention.

EXAMPLE 1

The process is carried out in a 200 $cm^3$ reactor equipped with anchor type stirrer, reflux condenser, nozzle for the inert gas input and a device for monomer feeding at 80° C. under constant values of stirring and nitrogen flow.

Stage (a): 0.0018 g of sodium dodecylbenzene sulfonate (SDBS) dissolved in 49.9 g of water is charged into a reactor and a nozzle for gas is connected. SDBS solution is heated to 80° C. for 30 min. Then 0.092 g of potassium persulfate (PP) dissolved in 6.3 g of water is charged. Within 15 min., a monomer mixture consisting of 0.453 g methyl methacrylate (MMA) and 0.0088 g methacrylic acid (MAA) is charged. The process continues after charging for 1 hour and results in the formation of latex with 100 nm particle size containing 1.18% solids.

Stage (b): 0.0046 g of SDBS dissolved in 2.3 g of water is charged into the reactor containing the whole amount of the latex prepared at stage (a). After 10 minutes, feeding of the monomer mixture consisting of 3.624 g MMA, 1.502 g MAA and 0.031 g ethylene glycol dimethacrylate (EGDM) is started and it is then continued for 3 hours at a constant rate followed by the process for half an hour.

Stage (c): An aqueous solution of SDBS and 0.101 g of PP dissolved in 7.43 g water is added to the latex prepared at stage (b). In 10 minutes, feeding of monomer mixture consisting of 12.002 MMA, 2.806 g n-butyl acrylate (BA), 0.709 g MAA, 0.026 g EGDM is started and then continued for 4.5 hours with constant rate. Then the process is continued for half an hour.

SDBS solution (0.227 g in 8.00 g of water) is charged by 4 equal portions. The first portion is charged at the beginning of stage (c) and every subsequent portion is charged after 70 minutes from the beginning of the previous charge.

Stage (d): 11.90 g of 4.0% aqueous ammonia solution is charged into the latex prepared at the stage (c) for 40 minutes.

Stage (e): 0.270 g of PP dissolved in 16.1 g of water is charged into the latex neutralized by ammonia. In 10 minutes, the feeding of the monomer mixture containing 11.40 g styrene (ST), 3.84 g MMA, and 0.27 g divinyl benzene (DVB) is started and completed within 3 hours. Then the process is continued for half an hour with subsequent cooling of the reaction mixture to 30–40° C. The latex obtained is collected.

Characteristics of the latex prepared:

| | |
|---|---|
| Solids | 26.2% wt |
| Particle diameter | 370 nm |
| Hollow diameter | 270 nm |
| Residual monomers | |
| Styrene | 0.03% wt |
| n-Butylacrylate | 0.04% wt |
| Methylmethacrylate | 0.007% wt |

The characteristics of the coating based on hollow particle latex and film forming latex (ST:BA:glycidil methacrylate:MAA=26.7:57,5:10.0:5,8% wt):

Hiding power of the coating: 60.5 g of hollow pigment/m$^2$.

EXAMPLE 2

The process is carried out in 350 cm$^3$ reactor equipped with an anchor type stirrer, reflux condenser, nozzle for the inert gas input and the device for monomer feeding at 80° C. under constant values of stirring and nitrogen flow.

Stage (a): 0.031 g of SDBS dissolved in 120 g of water is charged into the reactor and the nozzle for gas is connected. SDBS solution is heated to 80° C. for 30 minutes. Then, monomer mixture consisting of 14.82 g MMA and 0.28 g MAA is charged. Within 10 min, 0.134 g of PP dissolved in 15 g of water is charged. The process continues after charging for 7 hours and results in the formation of latex with 90 nm particle size containing 9.70% wt of solids.

Stage (b): 10.11 g of seed latex prepared at stage (a) containing 80.4 g of water is charged into the reactor, stirring is started and the nozzle for gas is connected. Seed latex is heated to 80° C. for 40 min. Then 0.045 g of PP dissolved in 25 g of water is added to the latex, and after 10 minutes, feeding with monomer mixture containing 6.74 g MMA, 2.84 g MAA. and 0.06 g EGDM is started. In 2.5 hours from the beginning of the process 0.045 g of PP dissolved in 2.5 g of water is additionally charged. Feeding continues for 5 hours followed by the process for another 1.5 hours.

Stage (c): Aqueous solution of SDBS and 0.22 g of PP dissolved in 6.45 g of water is added to the latex prepared at the stage (b). After 10 minutes, feeding of the monomer mixture consisting of 23.88 g MMA, 5.68 g BA, 1.42 g MAA, 0.043 g EGDM is started, which then lasts for 4.5 hours at a constant rate. Then, the process is continued for another hour.

An SDBS solution containing 0.48 g in 8 g of water is charged with 4 equal portions. The first portion is charged at the beginning of the stage (c), then every subsequent portion is charged after 70 min from the beginning of the previous charge.

Stage (d): 29.4 g of 3.6% aqueous solution of ammonia is charged into the latex prepared at the stage (c) for 40 minutes.

Stage (e): 0.39 g of PP dissolved in 20.15 g of water is charged into the latex neutralized by ammonia. After 10 minutes, the feeding of the monomer mixture containing 18.86 g ST, 6.48 g acrylonitrile (AN) and 0.48 g DVB is started and completed within 3 hours. Then, the process is continued for 1.5 hours with subsequent cooling of the reaction mixture to 30–40° C. and the latex obtained is collected.

Stage (f): 15.4 g of 3.5% aqueous solution of ammonia is charged into the latex prepared at the stage (e) for 15 m in at 80° C. Then, 0.28 g of SDBS and 0.36 g of PP dissolved in 28.5 g of water is added. After 10 minutes, the monomer mixture containing 3.82 g ST, 6.74 g BA, 0.57 g MMA, and 0.23 g EGDM is added. After the charging is completed, the process continues for 40 min. The latex is cooled and collected.

Characteristics of the latex prepared:

| | |
|---|---|
| Solids | 27.62% wt |
| Particle diameter | 430 nm. |
| Hollow diameter | 280 nm. |
| Residual monomers | |
| Styrene | 0.006% wt |
| n-Butylacrylate | 0.024% wt |
| Hiding power of the coating: | 76.1 g of hollow pigment/m$^2$. |

EXAMPLE 3

The process is carried out according to that described in Example 2 with the following differences and additions:

Stage (a) recipe:

| | |
|---|---|
| Stage (a) recipe: | |
| MMA | 14.82 g |
| MAA | 0.28 g |
| SDBS | 0.02 g |
| PP | 0.134 g |
| Water | 135 g |
| Solids | 9.76% wt |
| Particle diameter | 100 nm |

| | |
|---|---|
| Stage (c) | |
| Recipe | |
| Latex prepared at stage (b) | |
| MMA | 18.43 g |
| ST | 4.60 g |
| BA | 5.26 g |
| MAA | 1.36 g |
| EGDM | 0.05 g |
| SDBS | 0.43 g |
| PP | 0.19 g |
| Water | 15.6 g |

| | |
|---|---|
| Stage (d) | |
| Recipe | |

-continued

| Latex prepared at stage (c) | |
|---|---|
| Ammonia 3,5% wt aqueous solution | 21.9 g |

| Stage (e) | |
|---|---|
| Recipe | |
| Latex prepared at stage (d) | |
| ST | 28.17 g |
| MMA | 9.41 g |
| DVB | 0.76 g |
| PP | 0.74 g |
| Water | 75.0 g |

| Stage (f) | |
|---|---|
| Recipe | |
| Latex prepared at stage (e) | |
| ST | 1.39 g |
| BA | 2.45 g |
| MMA | 0.21 g |
| EGDM | 0.05 g |
| Ammonia 3,5% wt aqueous solution | 5.6 g |
| SDBS | 0.10 g |
| PP | 0.13 g |
| Water | 10.4 g |

Characteristics of the latex prepared

| Solids | 33.9% wt |
|---|---|
| Particle diameter | 560 nm |
| Hollow diameter | 310 nm |
| Hiding power of the coating: | 71.1 g of hollow pigment/m$^2$ |
| Residual monomers: | |
| Methyl methacrylate | 0.010% wt, |
| n-Butylacrylate | 0.012% wt, |
| Styrene | 0.0333% wt. |

EXAMPLE 4

The process is carried out according to that described in Example 2 with the following differences and additions.

Stage (a) is carried out according to Example 3.

| Stage (b): | |
|---|---|
| Recipe | |
| Seed latex | 11.33 g |
| MMA | 7.56 g |
| MAA | 3.18 g |
| EGDM | 0.07 g |
| PP | 0.11 g |
| Water | 101.5 g |

Feeding lasts for 7 hours followed by the process for another 1 hour.

| Stage (c): | |
|---|---|
| Recipe | |
| Latex prepared at stage (b) | |
| MMA | 29.37 g |
| BA | 6.77 g |
| MAA | 1.74 g |
| EGDM | 0,07 g |
| PP | 0.26 g |
| SDBS | 0.55 g |
| Water | 21.46 g |

Stage (d): 27.8 g of ammonia 3.8% aqueous solution is charged.

| Stage (e): | |
|---|---|
| Recipe | |
| Latex prepared at stage (d) | |
| ST | 25.85 g |
| AN | 8.50 g |
| DVB | 1.39 g |
| PP | 0.69 g |
| Water | 21.86 g |

Characteristics of the latex prepared:

| Solids | 25.5% wt. |
|---|---|
| Particle diameter | 500 nm |
| Hollow diameter | 300 nm |
| Residual monomers | |
| Styrene | 0.04% wt |
| Divinylbenzene | 0.003% wt |

Hiding power: 75.4 g of hollow pigment/m$^2$

EXAMPLE 5

The process is carried out according to that described in Example 4 with the following differences and additions:

| Stage (a): | |
|---|---|
| Recipe | |
| MMA | 14.84 g |
| MAA | 0.28 g |
| SDBS | 0.016 g |
| PP | 0.134 g |
| Water | 135 g |
| Particle diameter | 120 nm |

Stage (d): 22.5 g of ammonia 3.8% aqueous solution is charged.

Characteristics of the latex prepared:

| Solids | 26.8% wt |
|---|---|
| Particle diameter | 500 nm |
| Hollow diameter | 370 nm |
| Residual monomers: | |
| Styrene | 0.04% wt |

-continued

| | |
|---|---|
| Divinylbenzene | 0.003% wt |
| Hiding power: | 66.7 g of hollow pigment/m² |

EXAMPLE 6

The process is carried out according to that described in Example 4 with the following differences:

Stage (a) is carried out according to Example 2.

| Stage (b): Recipe | |
|---|---|
| Seed latex | 8.60 g |
| MMA | 7.82 g |
| MAA | 2.54 g |
| EGDM | 0.051 g |
| PP | 0.084 g |
| SDBS | 0.006 g |
| Water | 60.8 g |

| Stage (c) Recipe Latex prepared at stage (b) | |
|---|---|
| MMA | 26.72 g |
| BA | 6.10 g |
| MAA | 1.57 g |
| EGDM | 0.06 g |
| SDBS | 0.50 g |
| PP | 0.22 g |
| Water | 18.0 g |

| Stage (d) Recipe Latex prepared at stage (c) | |
|---|---|
| 23.7 g of ammonia 3.8% aqueous solution | |

| Stage (e) Recipe Latex prepared at stage (d) | |
|---|---|
| ST | 32.68 g |
| MMA | 10.91 g |
| DVB | 0.35 g |
| PP | 0.86 g |
| Water | 76.2 g |

Characteristics of the latex prepared:

| | |
|---|---|
| Solids | 33.9% |
| Particle diameter | 560 nm |
| Hollow diameter | 280 nm |
| Residual monomers | |
| Styrene | 0.03% wt |
| n-Buthylacrylate | 0.018% wt |

-continued

| | |
|---|---|
| Methylmethacrylate | 0.013% wt |
| Hiding power: | 76.0 g of hollow pigment/m² |

Comparative Example.

Preparation of latex according to U.S. Pat. No. 4,427,836
The preparation of seed latex.

The process is carried out in a 500 cm³ flask equipped with a stirrer, reflux condenser, nozzle for the inert gas input and a device for feeding monomers. 290 g of distilled water and 0.20 g of SDBS are heated in the flask to 78° C. under nitrogen atmosphere with stirring. The monomer emulsion is prepared using 27 g of water, 0.04 g of SDBS, 41.6 g of BA, 37.4 g of MMA and 1.04 g of MAA. 5 g of the emulsion is added to the flask. Then, 0.3 g of ammonium persulfate is dissolved in 1 ml of water. After 15 minutes, the feeding of the remaining monomer emulsion is started with the rate of 1.6 gl/min. 15 min after the monomer feeding is completed, the reaction mixture is cooled. Then 0.14 cm³ of t-butyl hydroperoxide (50%) and 0.05 g of sodium formaldehyde sulfoxylate dissolved in 2 cm³ of water are added at 55° C. Then, 1.16 g of 24% aqueous solution of ammonia is added at 25° C.

Stage A.

0.42 g of sodium persulfate (SP) dissolved in 2.5 g of water is added to 211.5 g of water heated to 84° C. in the 500 cm³ flask under nitrogen atmosphere, followed by the addition of 6.2 g of seed latex. A monomer emulsion consisting of 23.5 g of water, 0.08 g of SDBS, 49 g of MMA, 21 g of MAA and 0.35 g of ethylene glycol diacrylate is added to the flask at 85° C. over a 3 hour period. After the completion of the monomer feeding, the dispersion is held at 85° C. for 30 min and cooled to 25° C.

Stage B.

0.21 g of SP followed by 13.5 g of latex obtained at Stage A are added to 240 g of water heated to 85° C. in a stirred reaction flask. 54 g of MMA is added over a 1 hour period at 85° C. The temperature is maintained at 85° C. for another 1.5 hours. Then a monomer mixture consisting of 30 g of BA and 24 g of MMA is charged during a 1 hour period. The heating is continued for another 2 hours. Then, the latex is cooled to 25° C.

Stage C.

Latex obtained in Stage B is neutralized with 17.4 g of 10% aqueous solution of ammonia at 25° C. under stirring. The neutralized latex is heated at 95° C. for 1 hour, and then cooled to 25° C.

The latex prepared is film forming at ambient temperatures. Therefore, the hiding power measurements were carried out without the addition of film forming latex. It appeared to be difficult to measure the hiding power using our techniques because the contrast ratio (R) was too low even for thick coatings. For example, R is equal to 0.547 at 350 g/m² surface density of polymer pigment.

What is claimed is:

1. A process for preparation of hollow polymer particle latexes by emulsion copolymerization with water soluble initiator and anionic surfactant, characterized in the following stages:

a) preparation by emulsion polymerization of a seed latex of a copolymer containing methyl methacrylate and methacrylic acid monomer units;

b) preparation by emulsion polymerization of a latex of a highly carboxylated copolymer containing methyl methacrylate monomer units, monoethylenically unsaturated carboxylic acid monomer units and a cross-linking agent and optionally containing vinyl aromatic monomer units, in the presence of the seed latex prepared in stage(a);

c) in the presence of the preparation by emulsion polymerization of an intermediate shell comprising a copolymer of methyl methacrylate, an acrylic acid ester, a monoethylenically unsaturated carboxylic acid and a cross-linking agent, and optionally containing vinyl aromatic monomer units, wherein said intermediate shell copolymer is prepared in the presence of the highly carboxylated latex synthesized at stage (b), and has a glass transition temperature below 80° C.;

d) swelling the particles prepared at stage (c) by the addition of a volatile basic compound;

e) preparation by emulsion polymerization of a hard shell in the presence of the swollen expanded particles prepared in stage (d), said hard shell comprising a copolymer of a vinyl aromatic compound, acrylonitrile and/or methyl methacrylate, and a cross-linking agent, said hard shell having a glass transition temperature above 80° C.; and f) optional preparation of an external shell.

2. Process according to claim 1, characterized in that the monoethylenically unsaturated carboxylic acid in both stages (b) and (c) is methacrylic acid.

3. Process according to claim 1, characterized in that the seed latex prepared at stage (a) has particle size of from 70 to 180 nm.

4. Process according to claim 1, characterized in that stage (b) comprises charging the water soluble initiator as two equal portions in the beginning of the reaction and in the middle of the process.

5. Process according to claim 1, characterized in that stage (c) comprises charging the anionic surfactant as equal portions in equal periods of time.

6. Process according to claim 1, characterized in that the ratio of weight concentrations of the sum of methyl methacrylate and vinyl aromatic compound to acrylic acid ester at stage (c) is within the range of 3.3–4.3.

7. Process according to claim 1, characterized in that the concentration of volatile basic compound at stage (d) is calculated in accordance with the following equation:

$$[B]=a/D-b$$

where $[B]$ is the volatile base concentration calculated as milliequivalents per 1 g of methacrylic acid charged at stages (a), (b) and (c), D is number average diameter of the seed particles (in nanometers) prepared at stage (a) and a and b are constants, a=1670, b=4.1.

8. Process according to claim 1, characterized in that additionally after stage (e), stage (f) is performed, comprising preparation by emulsion polymerization of an external shell consisting of a copolymer of a vinyl aromatic compound, an acrylic acid ester, methacrylic acid and a cross-linking agent in the presence of the latex particles prepared in stage (e), said external shell having a glass transition temperature below 15° C.

9. Process according to claim 8, characterized in that the volatile base concentration at stage (f) is equal to 20–80 meq per 1 g of methacrylic acid charged at stage (f).

10. Process according to claim 8, characterized in that the weight ratio of the copolymer prepared at stage (f) to the copolymer prepared at stage (e) is 0.1–1.0.

11. Process according to claim 1, characterized in that the temperature for the preparations is 60–95° C.

12. Process according to claim 1, characterized in that the process is performed in one reactor without isolation of intermediate products or it is performed stagewise with the isolation of intermediate products, in more than one reactor.

13. Process according to claim 1, characterized in that stage a) comprises the preparation of a seed latex of a copolymer containing methyl methacrylate and methacrylic acid mononumeric units; wherein the weight ratio of monomers/initiator/water during polymerization is equal to 1/(0.1–0.3)/50–150).

14. A coating formulation, characterized in that it comprises a latex prepared according to claim 1.

* * * * *